US008371921B1

(12) United States Patent
Perrone et al.

(10) Patent No.: US 8,371,921 B1
(45) Date of Patent: Feb. 12, 2013

(54) KENO GAME WITH POKER HANDS USING DETERMINISTIC CARD PLACEMENTS

(75) Inventors: Rick Perrone, Darien, CT (US); Roger Kidneigh, Henderson, NV (US); Kal Patel, Stamford, CT (US); George Stadnick, New York, NY (US)

(73) Assignee: Tournament One, Corp., Stamford, CT (US)

( * ) Notice: Subject to any disclaimer, the term of this patent is extended or adjusted under 35 U.S.C. 154(b) by 196 days.

(21) Appl. No.: 12/790,634

(22) Filed: May 28, 2010

Related U.S. Application Data

(60) Provisional application No. 61/181,665, filed on May 28, 2009.

(51) Int. Cl.
*G06F 17/00* (2006.01)

(52) U.S. Cl. ............................... 463/18; 463/16; 463/17

(58) Field of Classification Search ............... 463/16–80
See application file for complete search history.

(56) References Cited

U.S. PATENT DOCUMENTS 3,565,437 A * 2/1971 Mitchell et al. ............... 273/256
6,030,288 A * 2/2000 Davis et al. ..................... 463/29
6,079,711 A 6/2000 Wei
6,132,311 A * 10/2000 Williams ........................ 463/13
6,368,212 B1 * 4/2002 Moody ........................... 463/13
6,533,664 B1 * 3/2003 Crumby .......................... 463/42
6,656,044 B1 12/2003 Lewis
8,074,986 B1 * 12/2011 Gebhart ........................ 273/146
2002/0113369 A1 8/2002 Weingardt
2004/0212147 A1 * 10/2004 Ward et al. ................. 273/138.1
2005/0059469 A1 3/2005 Gail
2006/0025199 A1 2/2006 Harkins
2006/0121976 A1 6/2006 Odom
2007/0052172 A1 * 3/2007 Dargue ......................... 273/292
2007/0123329 A1 5/2007 Frank
2007/0149279 A1 * 6/2007 Norden et al. .................. 463/29
2010/0004046 A1 * 1/2010 Brunelle ......................... 463/18
2010/0261525 A1 10/2010 Rathsack

OTHER PUBLICATIONS

Office Action in U.S. Appl. No. 12/829,805.

* cited by examiner

*Primary Examiner* — Michael Cuff
(74) *Attorney, Agent, or Firm* — Muskin & Cusick LLC

(57) ABSTRACT

A method, apparatus, and computer readable storage to implement a wagering game combining keno and poker. A first payout is made based on a number of matches between player selected numbers and computer generated numbers on a keno grid. Card values are also associated with each number in the keno grid. The card values are determined using a deterministic hashing algorithm. Then, for each matched number, the best five card (or any other predetermined number of cards) poker hand is made using the associated card values, and a payout is made (if earned) based on a rank of the best poker hand.

18 Claims, 8 Drawing Sheets

| | | | | | | | | | |
|---|---|---|---|---|---|---|---|---|---|
| 1 | 2 | 3 | 4 | 5 | 6 | 7 | 8 | 9 | 10 |
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |

FIGURE 4

KENO GAME WITH POKER HANDS USING DETERMINISTIC CARD PLACEMENTS

CROSS REFERENCE TO RELATED APPLICATIONS

This application claims benefit to both U.S. provisional application 61/181,665, entitled, "Keno Poker", filed on May 28, 2009, which is incorporated by reference herein in its entirety.

BACKGROUND OF THE INVENTION

1. Field of the Invention

The present general inventive concept is directed to a method, apparatus, and computer readable storage medium directed to a game of chance which combines the games of keno and poker.

2. Description of the Related Art

Lottery and casino games are a huge industry in the United States. Both Keno and poker are popular gambling games What is needed is an exciting manner in which these two games can be combined, providing more excitement and entertainment for players.

SUMMARY OF THE INVENTION

It is an aspect of the present invention to provide an exciting method to play a keno type game.

The above aspects can be obtained by a method that includes (a) receiving a wager from a player; (b) displaying a grid of numbers; (c) inputting selected numbers from the player; (d) generating random numbers using an electronic random number generator; (e) determining a number of matches between the selected numbers and the random numbers; (f) paying a matching award, if earned, based on the number of matches; (g) determining card associations for numbers in the grid of numbers and card values, the card associations being deterministic based on a seed value; (h) determining a best poker hand out of all card values associated with the matches; and (i) paying a poker award, if earned, based on the best poker hand.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 4 is a drawing of an exemplary screen output of a keno grid using 80 numbers, according to an embodiment;

DESCRIPTION OF THE PREFERRED EMBODIMENTS

Figure 1:
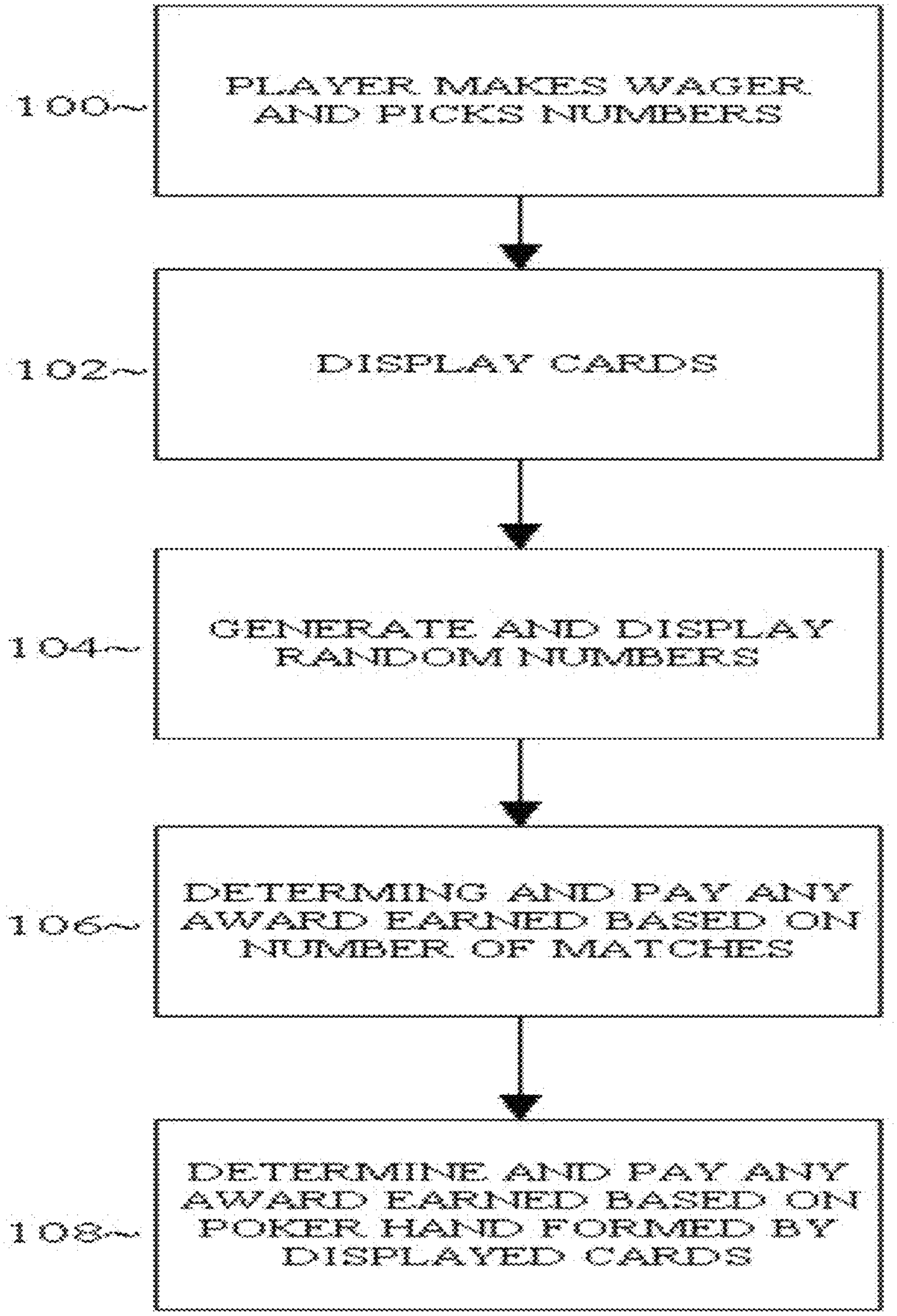
FIG. 1 is an exemplary flowchart illustrating a game combining keno and poker, according to an embodiment.

Reference will now be made in detail to the presently preferred embodiments of the invention, examples of which are illustrated in the accompanying drawings, wherein like reference numerals refer to like elements throughout.

The present inventive concept relates to a method, apparatus, and computer readable storage medium to implement a method to perform a wagering game that can be played by a player. The game combines aspects of keno and poker, and generates card values for matches (between the player's picks and the computer generated numbers) which can then be used to form a poker hand which can then pay a payout based on a rank of the poker hand. In addition to being played as a stand-alone game, the methods described herein can also be played as a social space, online lottery game, or bonus game on an electronic gaming machine.

FIG. 1 is an exemplary flowchart illustrating a game combining keno and poker, according to an embodiment.

The method can begin with operation 100, wherein the player makes a wager and picks his or her selected numbers (or spots). The player can choose any number of keno numbers (typically from 1-20). Displayed to the player is a keno grid of 80 numbers, and the player can mark his or her selected numbers on the grid. The player can typically select the amount the player wishes to wager on. The amount wagered is then used when payouts are made (see operations 106 and 108), typically winning payouts are paid as a multiple of the amount wagered. As an alternative to placing a single wager, multiple wagers can be placed which pay on different aspects of the game. For example, a keno wager can be placed which pays based on a number of matches (see operation 106). An additional poker wager can be placed which pays based on a rank of the poker hand (see operation 108). The amounts of the keno wager and the poker wager do not have to be equal.

From operation 100, the method proceeds to operation 102, which displays cards associated with each number in the grid. The card associations are determined in a manner described below in more detail.

From operation 102, the method proceeds to operation 104, which generates and displays random numbers chosen by a lottery draw system, electronic gaming machine, casino, individual game, or electronic server. Historically, such random numbers were generated by numbered balls being drawn out of a bubble but the random numbers can be determined in any manner (e.g., electronic random number generator, etc.) The generated random numbers are displayed to the player.

From operation 104, the method proceeds to operation 106, which determines and pays any earned award based on the number of matches. A paytable can be used to determine payouts based on matches. The payout based on the number of matches does not consider the cards associated with each number. For example, Table I illustrates one example of payouts that can be used when a player marks (picks) 1 spot on the grid. For 0 matches (also known as catches) the player loses (wins 0). For 1 match (also known as catches) the player wins 3 units (one unit being the amount the player bet).

TABLE I

| Matches | Pays |
|---|---|
| 0 | 0 |
| 1 | 3 |

Table II below is another example of a paytable that can be used when a player marks 5 spots on the grid. Awards based on the number of matches between the player's picks and the computer generated random numbers can be known as a "matching award."

TABLE II

| Matches | Pays |
|---|---|
| 0 | 0 |
| 1 | 0 |
| 2 | 0 |
| 3 | 1 |
| 4 | 10 |
| 5 | 800 |

Thus, based on the number of matches, the player is paid accordingly. The payout is made based on the amount wagered in operation 100 (if a single wager was made which covers both the keno and poker aspects, then the payout is made based on the single wager, while if a keno wager was made (which does not pay on the poker hand) then the payout can be made based on the keno wager).

From operation 106, the method proceeds to operation 108, which determines and pays any earned award based on a poker hand formed by displayed cards. On all matches (where a player's selection from operation 100 matches a random number from operation 104), a card associated with that number is activated and is used to form a poker hand. A rank of the best poker hand (using a maximum of 5 cards, although the hand could be formed using less than 5 cards for example a high pair) out of all of the active cards is determined. The rank is then compared to a paytable and if the rank is a winning rank the player is paid a respective payout. Table III illustrates on example paytable based on a best possible poker rank formed using the active (matched) cards.

TABLE III

| Hand | payout |
|---|---|
| Royal flush | 1000 |
| Straight flush | 100 |
| Four of a kind | 25 |
| Full house | 15 |
| Flush | 10 |
| Straight | 5 |
| Three of a kind | 4 |
| Two pair | 3 |
| Jacks or better | 1 |
| All others | 0 |

For example, if there are three active cards (jack-hearts/jack-spades/2-diamonds), then the player would have a hand of Jacks or better and win 1 times a unit (a unit can be the player's original bet or a dollar amount (e.g., $1)). If there are six active cards (2-spades/2-clubs/2-diamonds/2-hearts/8-clubs/7-spades), the best possible 5 card hand is (2-spades/2-clubs/2-diamonds/2-hearts/8-clubs) which has a rank of four of a kind which pays 25. If a single wager was made (in operation 100 which covers both the keno and poker aspects), then the poker payout is made based on that wager, while if a poker wager was made (which does not pay on the keno aspect) then the poker payout is made based on the poker wager.

Thus, as illustrated in FIG. 1, the player has two ways to win (by getting paid based on number of matches and also based on a poker rank).

In operation 102, card values are associated with values in the grid. These can be determined by using a hashing algorithm to determine a card layout predicated on a game ID (or other game seed). The game ID is a unique number that is assigned to each game by a server. The game ID can be transmitted by the server to each individual electronic gaming machine implementing the wagering games described herein. Or, in the case of the lottery, the game ID is distributed across a network of lottery terminals and/or monitor game displays. The methods described herein to determine the card associations can be performed on the individual electronic game machine itself, or by a remote server upon which the associations will then be transmitted to the individual machine so the individual machine can display the card associations. Each game has a unique ID, and each generated ID can be an integer number simply incrementing the previously assigned ID by one. Thus, the card layout is not generated randomly, but based on the game ID. Thus, given the game ID, the particular card layout for that game ID can be determined with certainty. Thus it can be said that the card layout is deterministic based upon the game ID. The game ID can be considered a "seed value" in that the game ID is used as a seed for the deterministic process to determine the card associations. In addition to game IDs, other values can be used such as a date, time, location, user inputted numbers, lottery card number, etc.

For example, a server can start with a game ID of '000001" and serve this game ID to a machine which will play the game described herein. This seed value is used to determining the deterministic card associations as described herein. The server will generate a next game ID of '000002' to the next machine that requests a game ID (typically a game ID will be requested when a player initiates a new game on a machine), or the lottery systems initiates the next draw based on a pre-defined schedule. The next machine will use this game ID ('000002') to determine the deterministic card associations as described herein. This process can continue iteratively. Instead of determining game IDs by increasing the previous value by one, other formulas can be used as well, such as using a random number as a game ID, or increasing a counter by 1 each time a game ID is requested and then encrypting this new value to generate the game ID.

Figure 2:
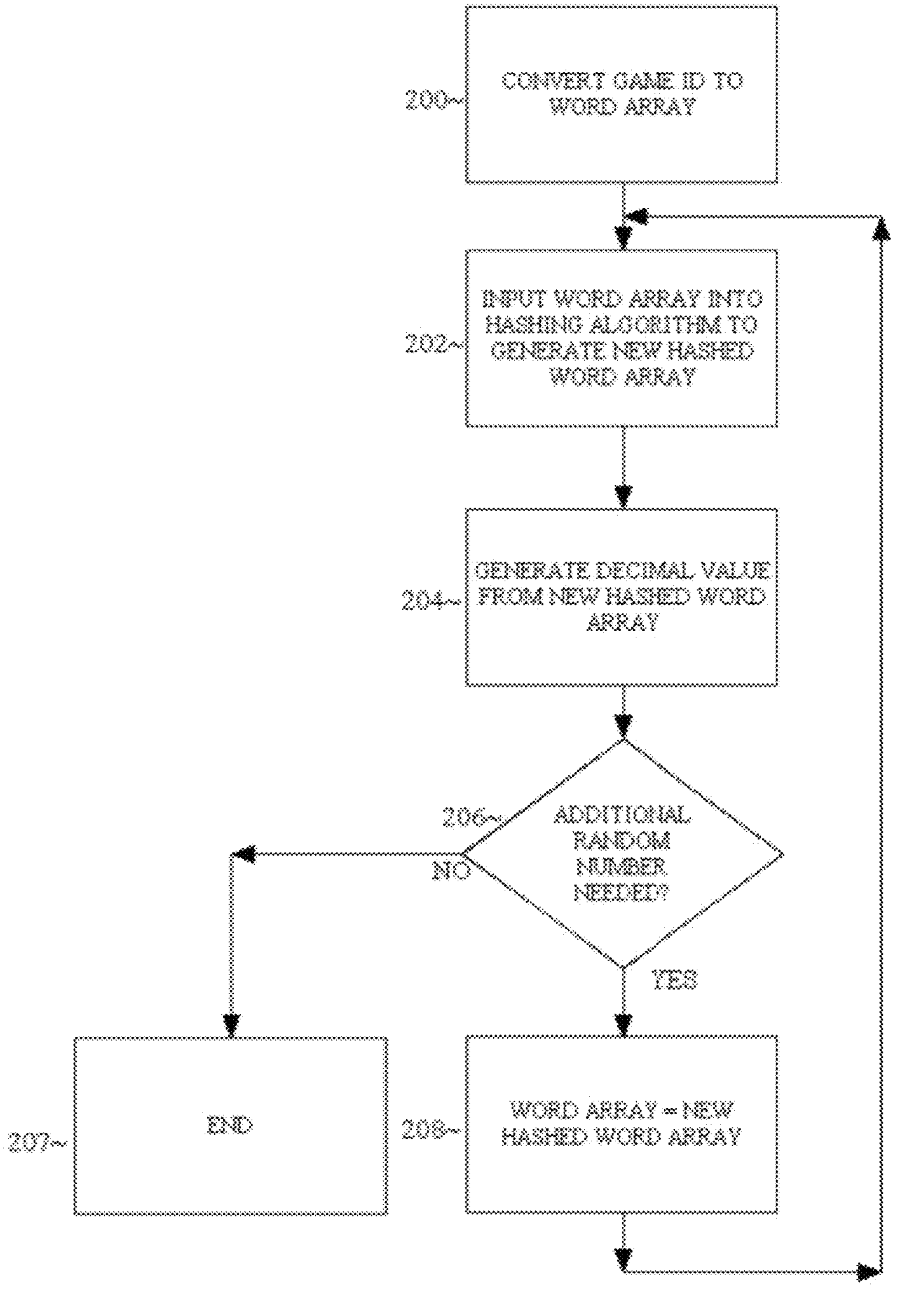
FIG. 2 is an exemplary flowchart illustrating a method of generating successive hashed numbers, according to an embodiment.

FIG. 2 is an exemplary flowchart illustrating a method of generating successive hashed numbers, according to an embodiment.

The method can begin with operation 200, which converts a game ID to a word array. A word array is a data structure that can be used to proceed in the algorithm. Each value in the array can be of fixed size (although this is not required). The game ID can be stored as a string, wherein each character in the string is a byte (e.g., 8 bits). A word can vary in size, but can be for example 4 bits. For every character in the string there will be a high order (first 4 bits) and a low order (last 4 bits) word. Iteratively, going from the first to last character in the string a word array is created.

From operation 200, the method proceeds to operation 202, which inputs the word array into a hashing algorithm to generate a hashed word array. Any hash algorithm (or function) can be used that converts the original word array into a hashed word array (such as MD5 or any other hashing algorithm). The generated hashed word array is a number that has properties of a random number (e.g., even distribution) but is not really random because it is entirely predicated upon the input (the word array input into the hashing algorithm). The outputted hashed word array would be 32 bits (8 words).

From operation 202, the method proceeds to operation 204, which generates a decimal value from the new hashed word array returned in operation 202. One way the word array can be converted to a decimal value is by building a 32 bit number from the word array. The outputted word array is already 32 bit so a direct conversion can be used. Iteratively going from the lowest to highest bit, a bit shift function can be used to create the decimal value.

The decimal value is then divided by the maximum possible value of the decimal value resulting in a value between 0 and 1. If unsigned 32 bit numbers are used, then the maximum possible value would be 2 to the 32nd power. This number will vary based on maximum bit size of number used. This value is then passed to operation 304 of FIG. 3 and used to determine card placement.

From operation 204, the method proceeds to operation 206, which determines if an additional random number is needed. If there are no more possible choices in the grid for placement of cards, then the method proceeds to operation 207 wherein no further random numbers are needed for this method. For example, 79 random numbers would be needed in a grid of 80 numbers, and the last card can be placed by default.

If in operation 206, additional random numbers are needed, then the method proceeds to operation 208, wherein the word array (to be used when operation 202 is performed again) becomes the new hashed word array (the result of the last instance of operation 202) which then returns to operation 202. In other words, the word array outputted from the hash algorithm is re-input into the algorithm again in order to generate another hashed number.

Figure 3:
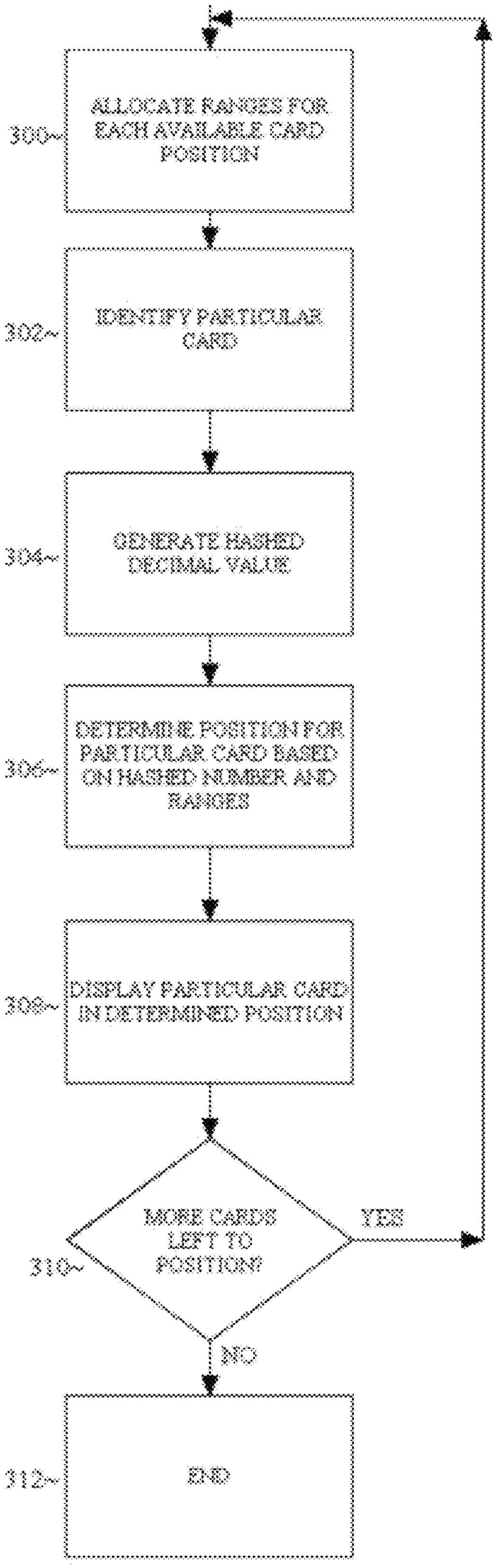
FIG. 3 is an exemplary flowchart illustrating an exemplary method of determining card placements predicated on an initial seed, according to an embodiment.

FIG. 3 is an exemplary flowchart illustrating an exemplary method of determining card placements predicated on an initial seed, according to an embodiment.

In operation 300, ranges are allocated for each available card position.

The algorithm described in FIG. 2 can be used 79 times to create 79 decimal numbers. These decimal numbers are used in the process described below to place 79 cards in 79 Keno number positions. The $80^{th}$ card can be assigned by default. Alternatively, if there are less than 80 cards in the deck (e.g., there are some blanks) then the algorithm should be run as many times as there are cards to place. Blanks can either be cards that have "blank" (no) value or grid numbers that do not get associated with a card (and thus they are "blank"). As stated herein, blanks do not get used in determining the best poker hand and have no use to the player (thus, the player would not want to get blanks).

For the first card placement, a domain of the size 1/80 (or 1/the number of available positions) or 0.0125 is created for each of the 80 positions. For example, a table such as Table IV below can be used.

TABLE IV

| | |
|---|---|
| grid #1 | >0.0000 and <= 0.0125 |
| grid #2 | >0.0125 and <= 0.0250 |

TABLE IV-continued

| | |
|---|---|
| grid #3 | >0.0250 and <= 0.0375 |
| grid #4 | >0.0375 and <= 0.0500 |
| . | |
| . | |
| . | |

Table IV continues for all positions in the grid (for simplicity only the first four values are shown).

Once a card has already been placed, then operation 300 would modify the ranges to exclude the placed card. For example, suppose the first decimal value (from operation 304) is 0.0137, and thus card #1 (ace-hearts) is placed in grid #2 (see operations 302-306). Table V below is generated which is a modified version of the previously used table (table IV) but with the range for position (grid) #2 now excluded from the ranges. Each range size is now 1/79 (or 1/number of available positions)

TABLE V

| | |
|---|---|
| grid #1 | >0.0000 and <= 0.0127 |
| grid #2 | >Occupied by card 1 (ace-hearts) |
| grid #3 | >0.0127 and <= 0.0253 |
| grid #4 | >0.0253 and <= 0.0380 |
| grid #5 | >0.0380 and <= 0.0506 |
| . | |
| . | |
| . | |

In Table V, the range size is 1/79 or (approximately) 0.0127 in order to spread out the available ranges to cover all numbers from 0 to 1 while giving each remaining grid position an equal chance of being filled. When the second card is placed, the range size will be 1/78 (approximately 0.0128) and the newly generated table will exclude the second card and fill in the available grid ranges in the table iteratively until the available positions all have a range.

For example, if the second decimal number chosen is 0.0255, then the second card (2-hearts) will be placed (see operations 302-306) in position #4 (from Table V) and new Table VI will be generated (note that all of the values in these tables are approximated for simplicity). Also note that Tables IV-VI are abridged for brevity, but they would all continue for all positions in the grid (e.g., grid #80). The last generated table would be used for operation 306 to determine the placement of the next card.

TABLE VI

| | |
|---|---|
| grid #1 | >0.0000 and <= 0.0128 |
| grid #2 | >Occupied by card 1 (ace-hearts) |
| grid #3 | >0.0128 and <= 0.0256 |
| grid #4 | >Occupied by card 2 (2-hearts) |
| grid #5 | >0.0256 and <= 0.0384 |
| . | |
| . | |
| . | |

Each time operation 300 is executed, it would generate the appropriate table for the game scenario presented (which grid positions are available/occupied). Each individual position size (upper range minus lower range) is determined by computing 1/number of available positions. The individual position sizes are then spread out equally throughout the available positions, thus resulting in an equal chance of a random value from 0 to 1 to pick any of the remaining positions (while the hashed value is not technically random, it would have properties of a random number such as equal distribution). When there is only one more card left to place (and the number of cards equals the number of grid positions), then there would only be one available grid # in the table left (with range 0 to 1), the last card to place would have to by default be placed in this position.

From operation 300, the method proceeds to operation 302, which identifies a particular card. The cards can be sorted in a particular order, wherein the same particular order should be used each time the algorithm is run (so that the card positions remain the same for identical game IDs). For example, Table VII lists an array of cards and their order. While Tables IV-VI are examples of tables that can be generated in operation 300, only one of these tables would be generated each time operation 300 is executed (the different tables are all identified for illustrative purposes) for the scenario presented which is then used when operation 306 is reached to determine which position the next card is placed in.

Note that in one embodiment, an extra suit of cards can be used (designated herein as KP for "keno poker"). Also 7 jokers (or wildcards) are used, although other numbers of jokers can be used as well. The joker (when matches) becomes the best possible card value to make the highest ranked poker hand for the player. For example, 5 jokers would create a royal flush. Other configurations of cards can be used as well.

For example, if a first decimal value is 0.0137, then from Table IV this would fall into the range for grid position #2 (which is from 0.0125 to 0.0250). Thus, the first card (from Table VII) is ace-hearts which would be placed in position #2.

From operation 306, the method proceeds to operation 308, which then displays the particular card (from operation 302) in the determined position (from operation 306).

From operation 308, the method proceeds to operation 310, which determines whether there are more cards left to position. If there are additional cards to place (e.g., there are more than two available positions to decide upon) then the method can return to operation 300. Also, if there is one card remaining to place and only one available place left on the grid, then this card can be placed in the remaining place by default without having to re-run the algorithm.

If there are no additional cards to place, then the method can proceed to operation 312, wherein the method ends and all cards in the deck are displayed associated with a grid number. The cards displayed may appear to be randomly placed to a player, but in reality, the cards are actually placed in a deterministic manner based on the game ID (or other seed), such that given the same seed, the cards would be placed in the identical fashion.

Thus, using the method illustrated in FIG. 3 (and described herein), since the decimal numbers generated are not really

TABLE VII

| # | card | # | card | # | card | # | card |
|---|---|---|---|---|---|---|---|
| 1 | ace-hearts | 2 | 2-hearts | 3 | 3-hearts | 4 | 4-hearts |
| 5 | 5-hearts | 6 | 6-hearts | 7 | 7-hearts | 8 | 8-hearts |
| 9 | 9-hearts | 10 | 10-hearts | 11 | Jack-hearts | 12 | queen-hearts |
| 13 | king-hearts | 14 | ace-spades | 15 | 2-spades | 16 | 3-spades |
| 17 | 4-spades | 18 | 5-spades | 19 | 6-spades | 20 | 7-spades |
| 21 | 8-spades | 22 | 9-spades | 23 | 10-spades | 24 | jack-spades |
| 25 | queen-spades | 26 | king-spades | 27 | ace-diamonds | 28 | 2-diamonds |
| 29 | 3-diamonds | 30 | 4-diamonds | 31 | 5-diamonds | 32 | 6-diamonds |
| 33 | 7-diamonds | 34 | 8-diamonds | 35 | 9-diamonds | 36 | 10-diamonds |
| 37 | jack-diamonds | 38 | queen-diamnd | 39 | king-diamnd | 40 | ace-clubs |
| 41 | 2-clubs | 42 | 3-clubs | 43 | 4-clubs | 44 | 5-clubs |
| 45 | 6-clubs | 46 | 7-clubs | 47 | 8-clubs | 48 | 9-clubs |
| 49 | 10-clubs | 50 | jack-clubs | 51 | queen-clubs | 52 | king-clubs |
| 53 | ace-KP | 54 | 2-KP | 55 | 3-KP | 56 | 4-KP |
| 57 | 5-KP | 58 | 6-KP | 59 | 7-KP | 60 | 8-KP |
| 61 | 9-KP | 62 | 10-KP | 63 | jack-KP | 64 | queen-KP |
| 65 | King-KP | 66 | joker | 67 | joker | 68 | joker |
| 69 | joker | 70 | joker | 71 | joker | 72 | joker |
| 73 | blank | 74 | blank | 75 | blank | 76 | blank |
| 77 | blank | 78 | blank | 79 | blank | 80 | blank |

Each time operation 302 is executed, a next card is identified (starting with #1-ace-hearts and increasing down the list each time until reaching 80-blank). Using the particular order (as opposed to a random order) is important so that the exact card layout can be reconstructed from the game ID (or other seed).

From operation 302, the method proceeds to operation 304, which generates a hashed decimal value. This can be performed as illustrated in FIG. 2, wherein operation 204 actually passes the decimal value (or number) to operation 304. The decimal value is a number from 0 to 1 and has properties of a random number (e.g., equal distribution over the long run) but is not random at all but determined based on the inputs.

From operation 304, the method proceeds to operation 306, which determines a particular position for the particular card identified (in operation 302) using the generated hashed number (from operation 304) and the respective table of ranges (from operation 300) reflecting which cards (if any) have already been placed.

random (but instead are generated using the hashing algorithm based on one initial seed value), and the order of cards placed is predetermined (for example using a table such as Table VII), then starting with a same seed for the hashing algorithm will generate the exact same card layout (associations) in the grid.

FIG. 4 is a drawing of an exemplary screen output of a keno grid using 80 numbers, according to an embodiment.

Typically, a keno grid has 80 numbers although in other embodiments other amounts of numbers can be used as well.

Figure 5:
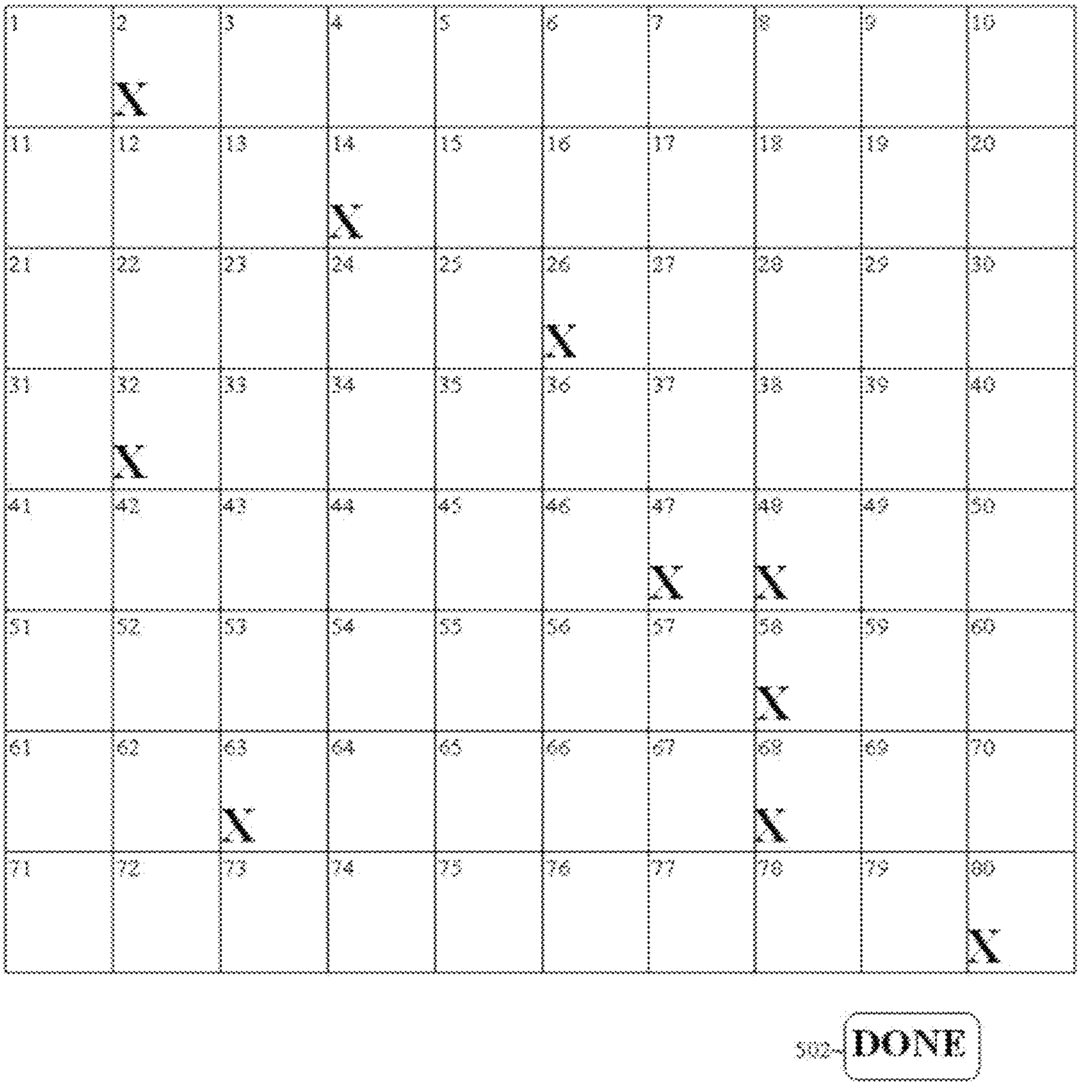
FIG. 5 is a drawing of an exemplary screen output of a keno grid with player selected numbers, according to an embodiment.

FIG. 5 is a drawing of an exemplary screen output of a keno grid with player selected numbers, according to an embodiment.

From the grid illustrated in FIG. 5, the player can choose spots to mark (from 2 to 20 spots at the player's choice), see operation 100. Depending on the number of spots the player chooses to mark, the active paytable would typically change to reflect the number of spots marked. When using an electronic gaming machine, players can simply touch the desired spots (numbers on the grid) to mark using a touch-screen. To cancel a spot that is already marked, the player can simply touch that number/spot again.

In the example in FIG. 5, the player has marked 10 spots. The player can press a "done" button 502 to indicate when the player is done marking all of the player's spots. If the player marks 20 spots, the player typically would not be allowed to mark additional spots until the player has canceled spot(s) that are already marked.

Once the player has finished marking all of his or her spots (by pressing the done button 502), then the card associations can be displayed (see operation 102).

Figure 6:
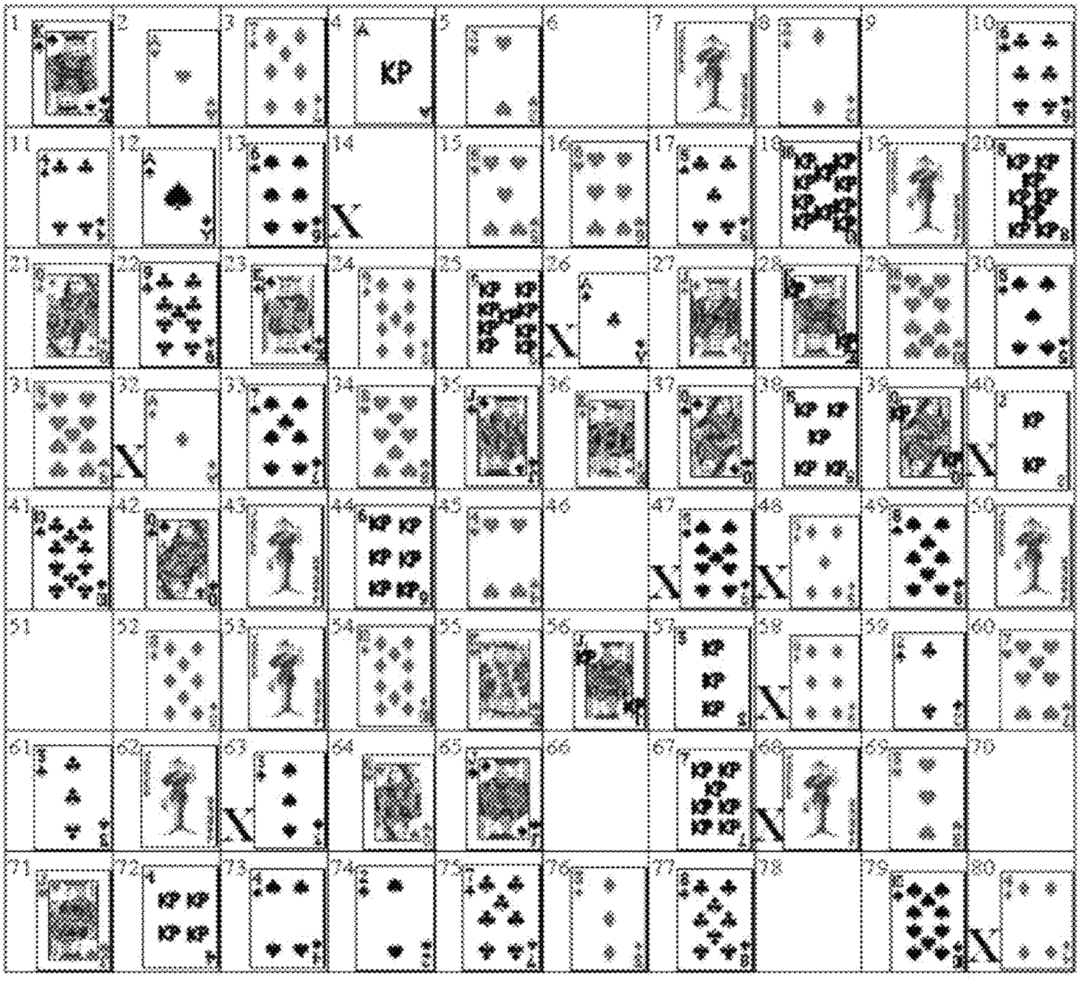
FIG. 6 is a drawing of an exemplary screen output of a keno grid with cards placed in the grid, according to an embodiment.

FIG. 6 is a drawing of an exemplary screen output of a keno grid with cards placed in the grid, according to an embodiment. The methods described herein can be used to determine the card associations (e.g., which card is placed in which number on the grid).

Figure 7:
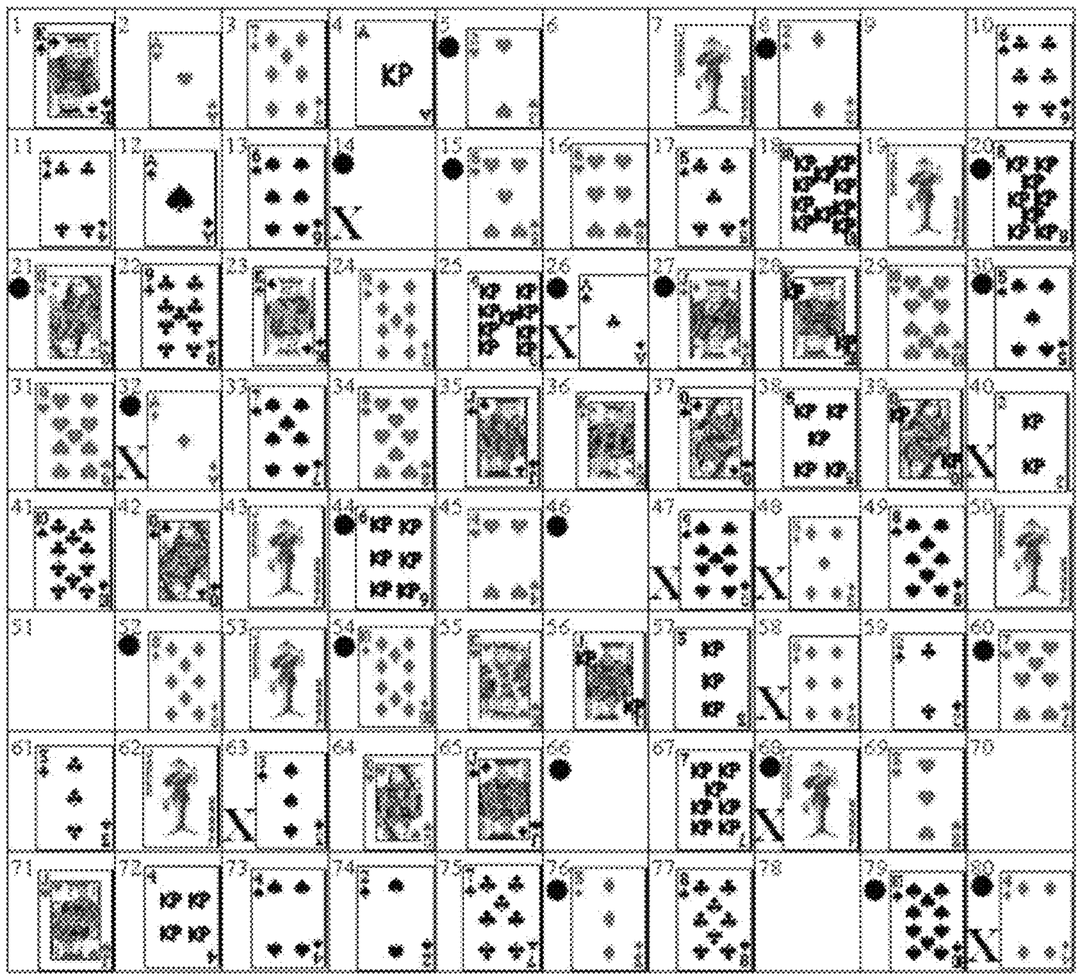
FIG. 7 is a drawing of an exemplary screen output of a keno grid with cards placed in the grid and computer selected results, according to an embodiment.

FIG. 7 is a drawing of an exemplary screen output of a keno grid with cards placed in the grid and computer selected results, according to an embodiment. This is performed in operation 104.

Note that the grid numbers that are matches are: 14, 26, 32, 68 and 80. The respective cards that are associated with these matches are: blank, ace-clubs, ace-diamonds, joker, and 4-diamonds. Now the best 5-card poker hand is made out of all of the matches. If there more than 5 matches (e.g., 7), then the best 5-card poker hand is computed out of all of those matches and used. In this example, the best poker rank is three aces (or three of a kind) since the joker would substitute for the card value to make the best (highest paying) hand (see Table III). The blank (number 14) is not used in forming a poker hand/rank. Since in this example, a three of a kind was made, this would pay 4:1 or 4 unites (from Table III).

In a further embodiment, the card associations can be displayed after the computer (or casino) has selected their results (instead of immediately after the player has marked their spots as illustrated in FIG. 6). In a further embodiment, only cards that are in grid positions that are in matches (the player and machine has picked the same number) will be displayed.

In a further embodiment, instead of determining card associations for each number in the grid, card associations can be determined as needed, that is, only for each match. In this embodiment, the same methodology to determine associations described herein can be used as well.

In yet another embodiment, instead of determining the random numbers (in operation 104) randomly, a set of numbers can be generated that are not really random but are also deterministic based upon the seed value (e.g., the game ID).

Figure 8:
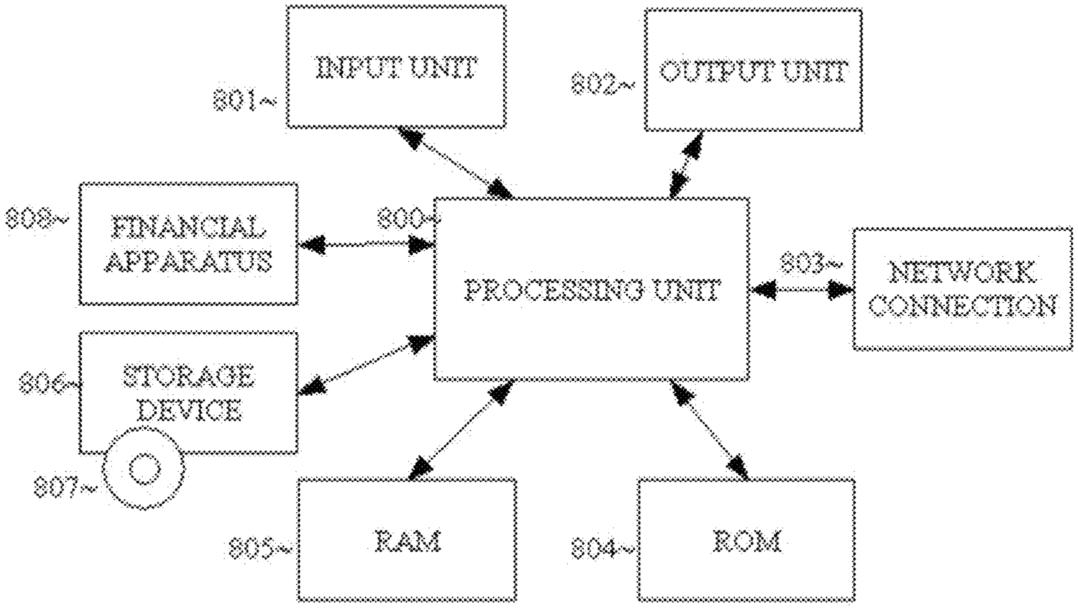
FIG. 8 is a block diagram of hardware that can be used to implement an electronic version of the methods described herein, according to an embodiment.

FIG. 8 is a block diagram of hardware that can be used to implement an electronic version of the methods described herein, according to an embodiment.

A processing unit 800 can be a microprocessor and any associated structure (e.g., bus, cache, etc.) The processing unit 800 can execute instructions to control the hardware to implement the methods described herein. The processing unit 800 can be connected to an input unit (e.g., keyboard, buttons, touch-screen display, etc.) and an output unit (e.g., touch-screen display, speakers, LCD display, etc.) The processing unit can also be connected to a network connection 803 which can connect to any type of computer communications network (e.g., DSL, LAN, WAN, WiFi, Internet, etc.) The processing unit 800 can also be connected to a ROM 804 and a RAM 805. The processing unit 800 can also be connected to a storage device 806 (e.g., hard disk, CD-ROM drive, DVD-drive, EPROM, etc.) which can read a computer readable storage medium 807 (e.g., CD-ROM, DVD, flash memory, etc.) The processing unit 800 is also connected to an optional financial apparatus 808 which can accept payment from a player (e.g., cash, credit card, electronic payment, etc), and may also have functionality to credit wins back to the player (e.g., electronic deposit, cashless ticket, etc.)

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to play a wagering game, the method comprising:

executing instructions on an electronic processing unit to perform:

receiving a wager from a player;

displaying a grid of numbers;

inputting selected numbers from the player;

generating random numbers using an electronic random number generator;

determining a number of matches between the selected numbers and the random numbers;

paying a matching award, if earned, based on the number of matches;

determining card associations for numbers in the grid of numbers and card values, the card associations being deterministic based on a seed value, the associations being determined via using the seed value to generate successive hashes, each hash being placed in a respective range out of a set of ranges, each range in the set of ranges being associated with a card value;

determining a best poker hand out of all card values associated with the matches; and paying a poker award, if earned, based on the best poker hand.

2. The method as recited in claim 1, wherein card associations are determined for all numbers on the grid and displayed for all numbers on the grid.

3. The method as recited in claim 1, wherein card associations are determined for all numbers on the grid and displayed only for grid numbers that are matches between the selected numbers and the random numbers.

4. The method as recited in claim 1, wherein card associations are determined only for all numbers on the grid that are matches between the selected numbers and the random numbers.

5. The method as recited in claim 1, wherein the card associations use a game deck comprising a standard deck of 52 cards plus an extra suit of 13 cards.

6. The method as recited in claim 5, wherein the game deck also comprises a plurality of wild cards.

7. The method as recited in claim 6, wherein the game deck also comprises blank cards.

8. The method as recited in claim 1, wherein the seed value is a game ID generated for the particular game.

9. The method as recited in claim 8, wherein the game ID is generated by a remote server that is remote from an electronic gaming device that is displaying the game to the player.

10. An electronic gaming device to play a wagering game, the electronic gaming device comprising:

an input device;

an output device;

a processing unit configured to operate with the input device and the output device, the processing unit configured to execute instructions to:

receive a wager from a player;

display a grid of numbers;

input selected numbers from the player;

generate random numbers using an electronic random number generator;

determine a number of matches between the selected numbers and the random numbers;

pay a matching award, if earned, based on the number of matches;

determine card associations for numbers in the grid of numbers and card values, the card associations being deterministic based on a seed value, the associations being determined via using the seed value to generate successive hashes, each hash being placed in a respective range out of a set of ranges, each range in the set of ranges being associated with a card value;

determine a best poker hand out of all card values associated with the matches; and pay a poker award, if earned, based on the best poker hand.

11. The device as recited in claim 10, wherein card associations are determined for all numbers on the grid and displayed for all numbers on the grid.

12. The device as recited in claim 10, wherein card associations are determined for all numbers on the grid and displayed only for grid numbers that are matches between the selected numbers and the random numbers.

13. The device as recited in claim 10, wherein card associations are determined only for all numbers on the grid that are matches between the selected numbers and the random numbers.

14. The device as recited in claim 10, wherein the card associations use a game deck comprising a standard deck of 52 cards plus an extra suit of 13 cards.

15. The device as recited in claim 14, wherein the game deck also comprises a plurality of wild cards.

16. The device as recited in claim 15, wherein the game deck also comprises blank cards.

17. The device as recited in claim 10, wherein the seed value is a game ID generated for the particular game.

18. The device as recited in claim 17, wherein the game ID is generated by a remote server that is remote from an electronic gaming device that is displaying the game to the player.

* * * * *